US012098977B2

(12) United States Patent
Fan et al.

(10) Patent No.: US 12,098,977 B2
(45) Date of Patent: Sep. 24, 2024

(54) LARGE-SCALE LOW-TEMPERATURE CONTROLLABLE ATMOSPHERIC BOUNDARY LAYER TEST SYSTEM FOR WIND AND SNOW SIMULATION

(71) Applicant: Harbin Institute of Technology, Harbin (CN)

(72) Inventors: Feng Fan, Harbin (CN); Qingwen Zhang, Harbin (CN); Huamei Mo, Harbin (CN); Guolong Zhang, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 221 days.

(21) Appl. No.: 17/941,102

(22) Filed: Sep. 9, 2022

(65) Prior Publication Data

US 2023/0160776 A1 May 25, 2023

(30) Foreign Application Priority Data

Nov. 22, 2021 (CN) .......................... 2021113847393

(51) Int. Cl.
*G01M 9/04* (2006.01)
*F25D 13/00* (2006.01)

(52) U.S. Cl.
CPC .............. *G01M 9/04* (2013.01); *F25D 13/00* (2013.01)

(58) Field of Classification Search
None
See application file for complete search history.

(56) References Cited

FOREIGN PATENT DOCUMENTS

| CN | 105358922 A | * | 2/2016 | ................ F25C 3/04 |
| CN | 113008585 B | * | 4/2022 | ................ F25C 3/04 |

* cited by examiner

*Primary Examiner* — Peter J Macchiarolo
*Assistant Examiner* — Jermaine L Jenkins
(74) *Attorney, Agent, or Firm* — IPRO, PLLC (57) ABSTRACT

The present disclosure provides a large-scale low-temperature controllable atmospheric boundary layer test system and method for wind and snow simulation. The system includes an atmospheric boundary layer wind tunnel, a plenum chamber and a refrigeration system. The atmospheric boundary layer wind tunnel includes an upper flow channel and a lower flow channel communicating with each other end to end. A power section is arranged in the upper flow channel. A settling chamber, a contraction section and a test section are sequentially arranged in the lower flow channel. Corners of a closed return wind tunnel are respectively provided with a transition section. A fan is disposed in the power section. An air heat exchanger is disposed in the settling chamber. The plenum chamber is divided by a partition into a storage room for storing snow particles and an operation room provided with a snow particle vibratory spreading device. The storage room is located at an upper part of the settling chamber. An air cooler is disposed in the storage room. The operation room is located at an upper part of the test section. The snow particle vibratory spreading device spreads snow particles that uniformly fall into the test section. The refrigeration system outputs a secondary refrigerant for heat exchange for the air cooler in the plenum chamber and the air heat exchanger in the atmospheric boundary layer wind tunnel. According to the present disclosure, the natural snowfall process is simulated through the cooperation of various parts of the system.

10 Claims, 4 Drawing Sheets

LARGE-SCALE LOW-TEMPERATURE CONTROLLABLE ATMOSPHERIC BOUNDARY LAYER TEST SYSTEM FOR WIND AND SNOW SIMULATION

TECHNICAL FIELD

The present disclosure belongs to the field of low-temperature wind and snow environment simulation for the atmospheric boundary layer in construction engineering, and particularly relates to a large-scale low-temperature controllable atmospheric boundary layer test system for wind and snow simulation.

BACKGROUND

Snow disaster, also called white disaster, is a natural disaster caused by a huge amount of snowfall for a long time. The occurrence of snow disaster is generally accompanied by various secondary hazards, such as traffic jams, line damage, grain production reduction, pasture closure and building collapses. Among them, building collapses have received widespread attention from the society because they directly endanger people's safety of life and property. According to the accident investigation, the sudden increase in snowfall may cause the building roof load to far exceed the design value. In addition to this, when air flows through the building, complex flow separation and reattachment may occur, and in the meanwhile, the air flow may change the trajectory of the snow particles falling in the air and drive the snow accumulated on the roof to drift. The interaction of wind and snow may cause redistribution of snow on the roof, forming local snow accumulation, thereby resulting in local overload of snow and causing building collapse. According to statistics, most of the affected buildings are snow load-sensitive structures such as large-span spatial structures. Large-span spatial structures have the characteristics of light roof structure, large roof area and large proportion of snow load to total load, and their design is often controlled by snow load. On the other hand, the large-span spatial structures are mostly used in stadiums, airport terminals, railway station buildings and other public buildings having crowded people and great impacts. Therefore, snow-induced engineering disasters in large-span spatial structures often lead to serious consequences. In order to avoid snow-induced building collapses, countries and regions deeply affected by snow disaster have invested a lot of manpower and material resources to carry out research on snow disaster prediction, prevention, control and treatment. At present, feasible methods for research in roof snow load include field observation, wind tunnel testing and numerical simulation. Among them, wind tunnel testing has become the most efficient means to research the inherent laws of the wind and snow movement on the roof by virtue of controllable test environment and high fidelity.

In order to exactly reveal the accumulation and evolution mechanism of snow on the roof, scholars have successively established professional climatic wind tunnels to simulate the accumulation-evolution process of roof snow under quasi-real conditions. The existing wind tunnels are mainly used to research the snow covering on small-scale objects such as vehicles in transportation, and thus, they are unable to reproduce the atmospheric boundary layer environment around large-scale objects such as buildings. As a result of small cross-sectional size of the test section and significant wall effect on the flow field, some wind tunnels are not available for testing a three-dimensional building model due to their blocking rate, let alone researching wind-induced snow drift on roofs of large-span spatial structures. Therefore, it is necessary to design a large-scale low-temperature controllable atmospheric boundary layer test system for wind and snow simulation.

SUMMARY

In view of this, the present disclosure is directed to a large-scale low-temperature controllable atmospheric boundary layer test system for wind and snow simulation, which simulates a natural snowfall process through the cooperation of various parts of the system, namely an atmospheric boundary layer wind tunnel, a refrigeration system and a plenum chamber.

In order to achieve the above object, the present disclosure adopts the following technical solution:

A large-scale low-temperature controllable atmospheric boundary layer test system for wind and snow simulation includes an atmospheric boundary layer wind tunnel, a plenum chamber and a refrigeration system. The atmospheric boundary layer wind tunnel is a closed return wind tunnel, the plenum chamber and the refrigeration system are both disposed outside the atmospheric boundary layer wind tunnel, and the plenum chamber is disposed at an inner loop space of the closed return wind tunnel.

The atmospheric boundary layer wind tunnel includes an upper flow channel and a lower flow channel communicating with each other end to end, a power section is arranged in the upper flow channel, a settling chamber, a contraction section and a test section are sequentially arranged in the lower flow channel from upstream to downstream, corners of the closed return wind tunnel are respectively provided with a transition section, a fan is disposed in the power section, and an air heat exchanger is disposed in the settling chamber.

The plenum chamber is divided by a partition into a storage room for storing snow particles and an operation room provided with a snow particle vibratory spreading device, the storage room is located at an upper part of the settling chamber, an air cooler is disposed in the storage room, the operation room is located at an upper part of the test section, and the snow particle vibratory spreading device spreads snow particles that uniformly fall into the test section.

The refrigeration system outputs a secondary refrigerant for heat exchange for the air cooler in the plenum chamber and the air heat exchanger in the settling chamber of the atmospheric boundary layer wind tunnel.

The refrigeration system includes a cold source system. The cold source system includes a primary circulation system, a secondary circulation system and a cooling circulation system. The primary circulation system includes a refrigerating unit, a primary chilled water pump, a buffer tank, a primary circulation secondary refrigerant into-buffer-tank pipe, a primary circulation secondary refrigerant out-of-buffer-tank pipe, a secondary refrigerant into-refrigerating-unit pipe and a secondary refrigerant out-of-refrigerating-unit pipe. The secondary circulation system includes a secondary chilled water pump, a secondary circulation secondary refrigerant into-buffer-tank pipe, a secondary circulation secondary refrigerant out-of-buffer-tank pipe, a secondary refrigerant into-heat-exchanger pipe and a secondary refrigerant out-of-heat-exchanger pipe. The cooling circulation system maintains a condensation number required when the refrigerating unit works.

A liquid outlet of the refrigerating unit communicates with a liquid inlet of the primary chilled water pump through the secondary refrigerant out-of-refrigerating-unit pipe. A liquid outlet of the primary chilled water pump communicates with a cold end liquid inlet of the buffer tank through the primary circulation secondary refrigerant into-buffer-tank pipe. A cold end liquid outlet of the buffer tank communicates with the secondary refrigerant into-refrigerating-unit pipe through the primary circulation secondary refrigerant out-of-buffer-tank pipe. The secondary refrigerant into-refrigerating-unit pipe communicates with a liquid inlet of the refrigerating unit. A hot end liquid outlet of the buffer tank communicates with a liquid inlet of the secondary chilled water pump through the secondary circulation secondary refrigerant out-of-buffer-tank pipe. A liquid outlet of the secondary chilled water pump exchanges heat for the air cooler and the air heat exchanger through the secondary refrigerant into-heat-exchanger pipe. The heat-exchanged secondary refrigerant enters a hot end liquid inlet of the buffer tank through the secondary refrigerant out-of-heat-exchanger pipe and the secondary circulation secondary refrigerant into-buffer-tank pipe.

Further, a net cross-sectional size of the test section in the lower flow channel is 2 m×2 m.

Further, a honeycomb and screens are disposed in the settling chamber, and guide vanes are disposed in the transition section.

Further, the operation room has an openable bottom, and a slide rail for installing the snow particle vibratory spreading device is disposed in the operation room.

Further, the upper flow channel, the lower flow channel and the plenum chamber are in the form of a spliced structure of cold room panels, a sealant is applied to splicing seams, and a structural steel frame is used outside the spliced structure.

Further, the atmospheric boundary layer wind tunnel is supported on a foundation by a plurality of structural steel frames.

Further, a communicating pipe is disposed between the secondary refrigerant into-heat-exchanger pipe and the secondary circulation secondary refrigerant out-of-buffer-tank pipe, a first regulating valve is disposed on the communicating pipe, and a second regulating valve is disposed on the secondary refrigerant into-heat-exchanger pipe.

Further, the cooling circulation system includes a cooling tower, a cooling water pump, a cooling tower water inlet pipe, a cooling tower water outlet pipe, a condenser water inlet pipe and a condenser water outlet pipe. The cooling tower communicates with a water inlet of the cooling water pump through the cooling tower water outlet pipe. A water outlet of the cooling water pump communicates with a cold end water inlet of the refrigerating unit through the condenser water inlet pipe. A cold end water outlet of the refrigerating unit communicates with the condenser water outlet pipe. The condenser water outlet pipe communicates with the cooling tower water inlet pipe. The cooling tower water inlet pipe communicates with a water inlet of the cooling tower.

A working method of a large-scale low-temperature controllable atmospheric boundary layer test system for wind and snow simulation specifically includes the following steps:

step 1) simulation of low-temperature environment: during the test, firstly setting a temperature value of a buffer tank according to a test temperature, regulating a refrigeration load by a refrigerating unit according to the set temperature of the buffer tank such that a temperature of a secondary refrigerant output by the refrigerating unit is consistent with the set temperature of the buffer tank, delivering the secondary refrigerant with a certain temperature into the buffer tank by a primary chilled water pump, and after the buffer tank reaches the set temperature, starting a secondary chilled water pump such that the secondary refrigerant is pressurized by the secondary chilled water pump to enter an air heat exchanger and an air cooler in a plenum chamber to realize heat exchange;

with regard to an increase in the temperature of the secondary refrigerant exiting from the air heat exchanger and the air cooler, regulating an opening of a first regulating valve and an opening of a second regulating valve to realize matching and fast response of refrigeration capacity, where when the test requires a high refrigeration capacity, the opening of the second regulating valve is larger, and the opening of the first regulating valve is smaller, such that the secondary refrigerant flows into the air heat exchanger through a secondary refrigerant into-heat-exchanger pipe at a high flow rate to maintain the temperature required by the test; when the test requires a low refrigeration capacity, the opening of the second regulating valve is smaller, and the opening of the first regulating valve is larger, such that the secondary refrigerant flows into the air heat exchanger through the secondary refrigerant into-heat-exchanger pipe at a low flow rate to maintain the temperature required by the test; and the opening of the first regulating valve and the opening of the second regulating valve (50) are automatically regulated according to the test temperature to regulate the temperature of the secondary refrigerant entering the air heat exchanger and the air cooler and to finally realize temperature control in a test section, thereby simulating the low-temperature environment;

step 2) simulation of low-temperature wind environment: after realizing the low-temperature environment required by simulation of a snowfall test in step 1), providing a wind environment of the test section mainly by a power system, where a motor drives a fan to generate an air flow, the air flow is guided by guide vanes in a transition section, rectified by a honeycomb and screens in a settling chamber, cooled by the air heat exchanger and developed over a long distance at the test section to finally form a stable low-temperature atmospheric boundary layer flow field at the test section, and the returned hot air is cooled again by the settling chamber and preserved by external cold room panels, thereby forming the closed low-temperature wind environment in the tunnel; and step 3) simulation of snowfall process: after simulating the low-temperature wind environment in step 2), continuously providing snow particles by using snow stored in a storage room of a plenum chamber and a snow particle vibratory spreading device in the operation room such that the particles after the vibration are transported by the air flow and uniformly spread in the test section, thereby forming a uniform and stable snowfall environment.

Further, in step 1), when the refrigerating unit works, a cooling tower provides cooling water to maintain a condensation number required when the refrigerating unit works, and a cooling water pump provides power to keep the cooling water circulating continuously.

Compared with the prior art, the large-scale low-temperature controllable atmospheric boundary layer test system for wind and snow simulation according to the present disclosure has the following advantages:

1. The system is mainly composed of the atmospheric boundary layer wind tunnel, the plenum chamber and the refrigeration system. By rationally designing the shape of the tunnel, the power system and the turbulence generating mechanism (including baffles, grids, roughness elements, etc.), realistic simulation of the wind speed field and the turbulent structure in the atmospheric boundary layer is realized, so that the complex air flow disturbance around the large-span spatial structure is reproduced, thereby creating a high-quality flow field environment for realizing the complex wind-induced snow drift two-phase flow.

2. By disposing the plenum chamber at the top of the test section of the wind tunnel, low-temperature storage and vibratory spreading of the snow particles are realized. Besides, considering the requirements of the ice and snow test for the low-temperature environment, the refrigerating and temperature control devices are disposed inside the atmospheric boundary layer wind tunnel and the plenum chamber to monitor the temperature in the test section of the wind tunnel and the plenum chamber in real time and maintain the temperature within the specified test temperature range.

3. The large-scale low-temperature controllable atmospheric boundary layer test system of the present disclosure can innovatively solve the problem of research in simulation of the whole accumulation-evolution process of snow on the roof of the large-span spatial structure under the wind-snow coupling effect, thereby providing a unique test platform for obtaining the roof snow load of the large-span structure, leading the research of snow load of the large-span spatial structure and seizing the commanding height of the building snow load research in the world.

BRIEF DESCRIPTION OF FIGURES

The accompanying drawings constituting a part of the present disclosure are used to provide further understanding to the present disclosure, and exemplary examples and descriptions of the present disclosure are used to explain the present disclosure and do not constitute an improper limitation to the present disclosure. In the accompanying drawings.

DESCRIPTION OF REFERENCE SIGNS 1, atmospheric boundary layer wind tunnel; 2, refrigeration system; 3, plenum chamber; 4, communicating pipe; 5, settling chamber; 6, contraction section; 7, test section; 8, transition section; 9, power section; 10, upper flow channel; 11, lower flow channel; 12, cold room panel; 13, sealant applied to splicing seam; 14, structural steel frame; 15, foundation; 16, honeycomb; 17, screen; 18, air heat exchanger; 19, partition; 20, storage room; 21, operation room; 22, air cooler; 23, slide rail; 24, snow particle vibratory spreading device; 25, fan; 26, guide vane; 27, cold source system; 28, primary circulation system; 29, secondary circulation system; 30, cooling circulation system; 31, refrigerating unit; 32, primary chilled water pump; 33, buffer tank; 34, primary circulation secondary refrigerant into-buffer-tank pipe; 35, secondary refrigerant into-refrigerating-unit pipe; 36, secondary chilled water pump; 37, secondary circulation secondary refrigerant into-buffer-tank pipe; 38, secondary refrigerant into-heat-exchanger pipe; 39, cooling tower; 40, cooling water pump; 41, cooling tower water inlet pipe; 42 condenser water inlet pipe; 43, first regulating valve; 44, primary circulation secondary refrigerant out-of-buffer-tank pipe; 45, secondary refrigerant out-of-refrigerating-unit pipe; 46, secondary circulation secondary refrigerant out-of-buffer-tank pipe; 47, secondary refrigerant out-of-heat-exchanger pipe; 48, cooling tower water outlet pipe; 49, condenser water outlet pipe; and 50, second regulating valve.

DETAILED DESCRIPTION

It should be noted that in the case of no conflict, the examples in the present disclosure and the features in the examples may be combined with each other.

The present disclosure will be described in detail below with reference to the accompanying drawings and in conjunction with the examples.

As shown in FIG. 1 to FIG. 6, a large-scale low-temperature controllable atmospheric boundary layer test system for wind and snow simulation includes an atmospheric boundary layer wind tunnel 1, a plenum chamber 3 and a refrigeration system 2. The atmospheric boundary layer wind tunnel 1 is a closed return wind tunnel, the plenum chamber 3 and the refrigeration system 2 are both disposed outside the atmospheric boundary layer wind tunnel 1, and the plenum chamber 3 is disposed at an inner loop space of the closed return wind tunnel.

The atmospheric boundary layer wind tunnel 1 includes an upper flow channel 10 and a lower flow channel 11 communicating with each other end to end. A power section 9 is arranged in the upper flow channel 10. A settling chamber 5, a contraction section 6 and a test section 7 are sequentially arranged in the lower flow channel 11 from upstream to downstream. Corners of the closed return wind tunnel are respectively provided with a transition section 8. A fan 25 is disposed in the power section 9. An air heat exchanger 18 is disposed in the settling chamber 5.

Figure 1:
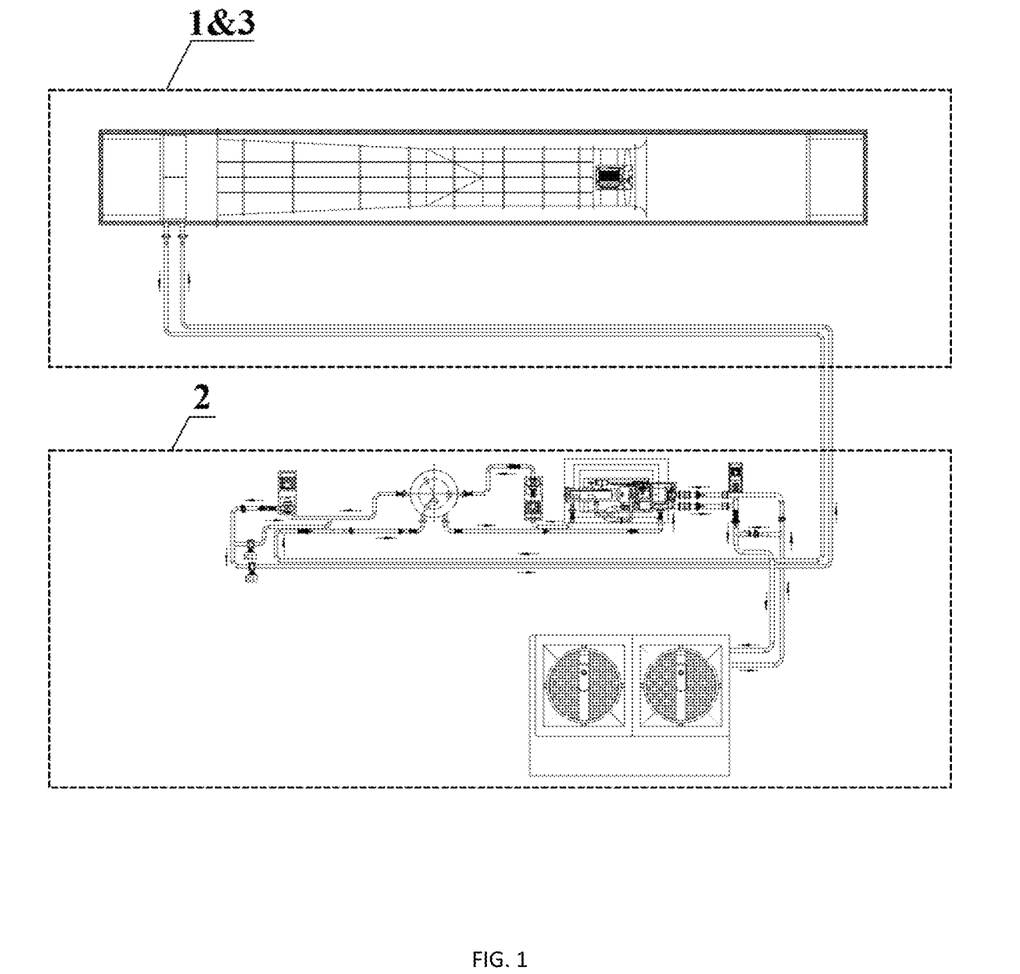
FIG. 1 is a schematic diagram showing an overall structure of a large-scale low-temperature controllable atmospheric boundary layer test system for wind and snow simulation according to an example of the present disclosure.
Figure 5:
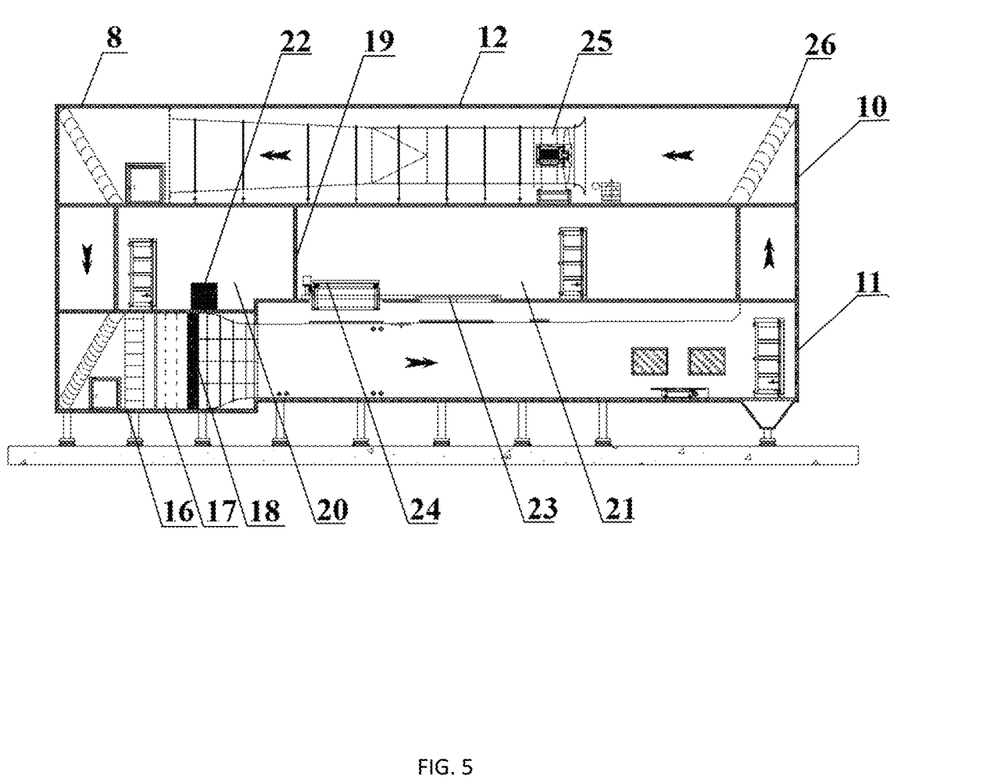
FIG. 5 is a schematic diagram showing an internal structure of the atmospheric boundary layer wind tunnel according to an example of the present disclosure.

The plenum chamber 3 is divided by a partition 19 into a storage room 20 for storing snow particles and an operation room 21 provided with a snow particle vibratory spreading device 24. The storage room 20 is located at an upper part of the settling chamber 5. An air cooler 22 is disposed in the storage room 20. The operation room 21 is located at an upper part of the test section 7. The snow particle vibratory spreading device 24 spreads snow particles that uniformly fall into the test section 7.

Figure 6:
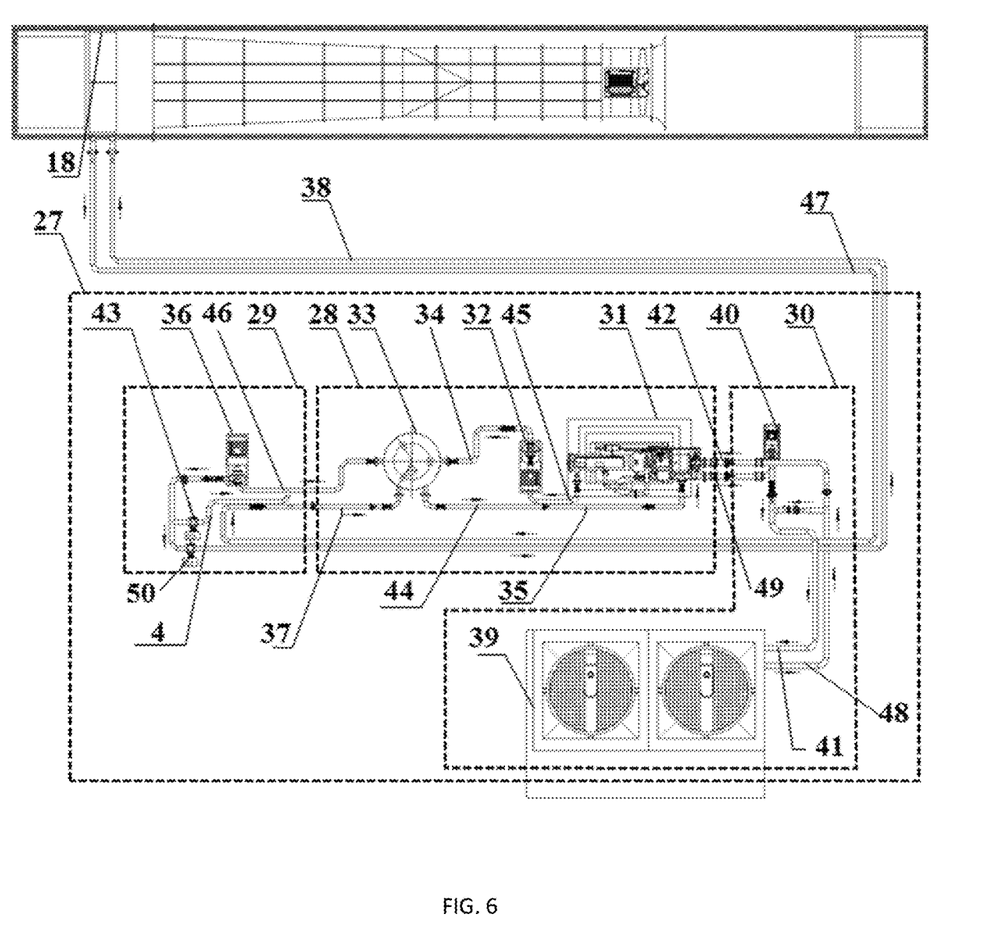
FIG. 6 is a schematic structural diagram of a refrigeration system.

The refrigeration system 2 outputs a secondary refrigerant for heat exchange for the air cooler 22 in the plenum chamber 3 and the air heat exchanger 18 in the settling chamber 5 of the atmospheric boundary layer wind tunnel 1.

The refrigeration system 2 includes a cold source system 27. The cold source system 27 includes a primary circulation system 28, a secondary circulation system 29 and a cooling circulation system 30. The primary circulation system 28 includes a refrigerating unit 31, a primary chilled water pump 32, a buffer tank 33, a primary circulation secondary refrigerant into-buffer-tank pipe 34, a primary circulation secondary refrigerant out-of-buffer-tank pipe 44, a secondary refrigerant into-refrigerating-unit pipe 35 and a secondary refrigerant out-of-refrigerating-unit pipe 45. The secondary circulation system 29 includes a secondary chilled water pump 36, a secondary circulation secondary refrigerant into-buffer-tank pipe 37, a secondary circulation secondary refrigerant out-of-buffer-tank pipe 46, a secondary refrigerant into-heat-exchanger pipe 38 and a secondary refrigerant out-of-heat-exchanger pipe 47. The cooling circulation system 30 maintains a condensation number required when the refrigerating unit 31 works.

A liquid outlet of the refrigerating unit 31 communicates with a liquid inlet of the primary chilled water pump 32 through the secondary refrigerant out-of-refrigerating-unit pipe 45. A liquid outlet of the primary chilled water pump 32 communicates with a cold end liquid inlet of the buffer tank 33 through the primary circulation secondary refrigerant into-buffer-tank pipe 34. A cold end liquid outlet of the buffer tank 33 communicates with the secondary refrigerant into-refrigerating-unit pipe 35 through the primary circulation secondary refrigerant out-of-buffer-tank pipe 44. The secondary refrigerant into-refrigerating-unit pipe 35 communicates with a liquid inlet of the refrigerating unit. A hot end liquid outlet of the buffer tank 33 communicates with a liquid inlet of the secondary chilled water pump 36 through the secondary circulation secondary refrigerant out-of-buffer-tank pipe 46. A liquid outlet of the secondary chilled water pump 36 exchanges heat for the air cooler 22 and the air heat exchanger 18 through the secondary refrigerant into-heat-exchanger pipe 38. The heat-exchanged secondary refrigerant enters a hot end liquid inlet of the buffer tank 33 through the secondary refrigerant out-of-heat-exchanger pipe 47 and the secondary circulation secondary refrigerant into-buffer-tank pipe 37.

Figure 2:
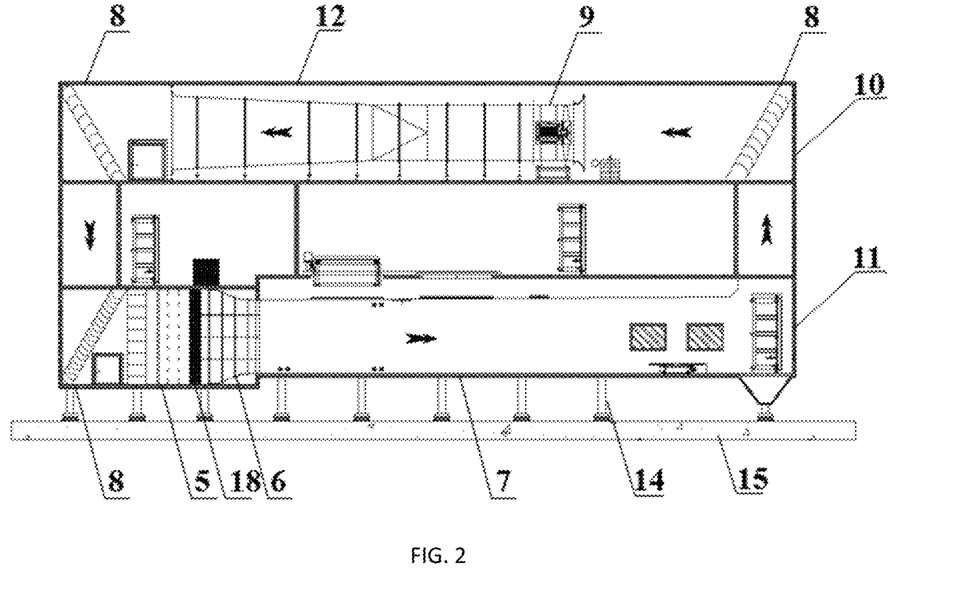
FIG. 2 is a front view of an atmospheric boundary layer wind tunnel according to an example of the present disclosure.
Figure 3:
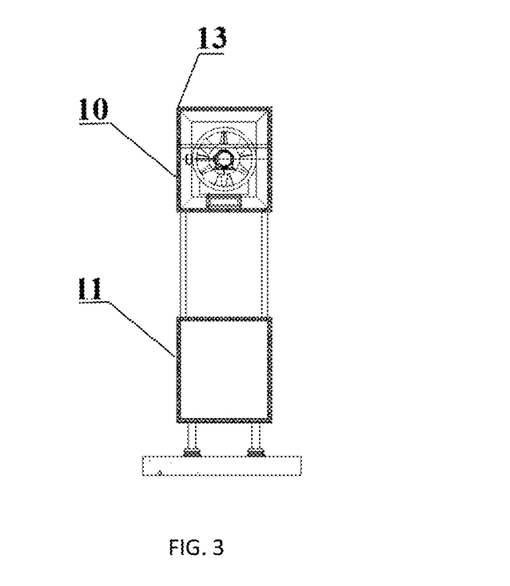
FIG. 3 is a side view of the atmospheric boundary layer wind tunnel according to an example of the present disclosure.
Figure 4:
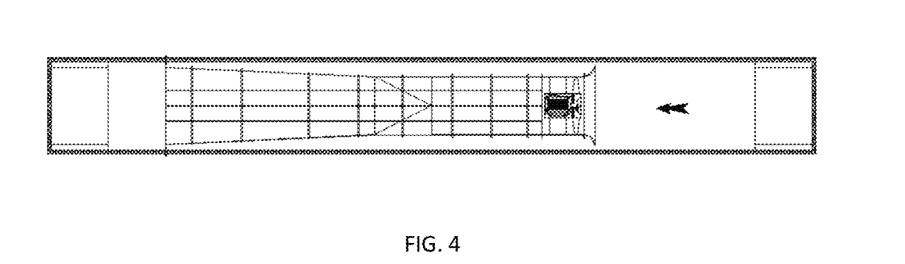
FIG. 4 is a top view of the atmospheric boundary layer wind tunnel according to an example of the present disclosure.

A net cross-sectional size of the test section 7 in the lower flow channel 11 is 2 m×2 m, to meet the requirements for the wind and snow test on large-span roofs and basically meet the requirements of similar criteria for the blockage rate of the cross-section.

The foundation of the power section 9 is an isolated foundation, which is structurally isolated from the atmospheric boundary layer wind tunnel 1 to prevent the vibration of the power system from being transmitted to the atmospheric boundary layer wind tunnel 1.

A honeycomb 16 and screens 17 are disposed in the settling chamber 5 to regulate the flow field. Guide vanes 26 are disposed in the transition section 8 to reduce flow separation on the inner side of the inlet and the outer side of the outlet at the corners (that is, transition sections 8) of the wind tunnel and reduce the kinetic energy loss.

The operation room 21 has an openable bottom, and a slide rail 23 for installing the snow particle vibratory spreading device 24 is disposed in the operation room 21. The snow particle vibratory spreading device 24 is an existing structure, and its specific structure and working principle will not be described here. During the test, the position of the snow particle vibratory spreading device 24 may be reasonably adjusted according to the specific wind speed in the test to ensure the snow particles to uniformly fall into the test area.

The upper flow channel 10, the lower flow channel 11 and the plenum chamber 3 are in the form of a spliced structure of cold room panels 12, a sealant is applied to splicing seams, and a structural steel frame 14 is used outside the spliced structure. The atmospheric boundary layer wind tunnel 1 is supported on a foundation 15 by a plurality of structural steel frames 14.

A communicating pipe 4 is disposed between the secondary refrigerant into-heat-exchanger pipe 38 and the secondary circulation secondary refrigerant out-of-buffer-tank pipe 46, a first regulating valve 43 is disposed on the communicating pipe 4, and a second regulating valve 50 is disposed on the secondary refrigerant into-heat-exchanger pipe 38. The first regulating valve 43 and the second regulating valve are disposed in parallel. The opening of the first regulating valve 43 and the opening of the second regulating valve 50 are regulated according to the refrigeration capacity required by the test, so that the flow rate is controlled to realize matching of the refrigeration capacity, thereby satisfying the test demands, and preventing excessive refrigeration capacity caused by the high flow rate from affecting the accuracy of the test temperature control.

The cooling circulation system 30 includes a cooling tower 39, a cooling water pump 40, a cooling tower water inlet pipe 41, a cooling tower water outlet pipe 48, a condenser water inlet pipe 42 and a condenser water outlet pipe 49. The cooling tower 39 communicates with a water inlet of the cooling water pump 40 through the cooling tower water outlet pipe 48. A water outlet of the cooling water pump 40 communicates with a cold end water inlet of the refrigerating unit 31 through the condenser water inlet pipe 42. A cold end water outlet of the refrigerating unit 31 communicates with the condenser water outlet pipe 49. The condenser water outlet pipe 49 communicates with the cooling tower water inlet pipe 41. The cooling tower water inlet pipe 41 communicates with a water inlet of the cooling tower 39. When the refrigerating unit 31 works, a cooling tower 39 provides cooling water to maintain a condensation number required when the refrigerating unit 31 works, and a cooling water pump 40 provides power to keep the cooling water circulating continuously.

The large-scale low-temperature controllable atmospheric boundary layer test system of the present application can simulate the natural snowfall process through the cooperation of various parts of the system, namely the atmospheric boundary layer wind tunnel 1, the refrigeration system 2 and the plenum chamber 3.

A working method of a large-scale low-temperature controllable atmospheric boundary layer test system for wind and snow simulation specifically includes the following steps:

Step 1) simulation of low-temperature environment: During the test, firstly a temperature value of a buffer tank 33 is set according to a test temperature, a refrigeration load is regulated by a refrigerating unit 31 according to the set temperature of the buffer tank 33 such that a temperature of a secondary refrigerant output by the refrigerating unit 31 is consistent with the set temperature of the buffer tank 33, the secondary refrigerant with a certain temperature is delivered into the buffer tank 33 by a primary chilled water pump 32, and after the buffer tank 33 reaches the set temperature, a secondary chilled water pump 36 is started such that the secondary refrigerant is pressurized by the secondary chilled water pump 36 to enter an air heat exchanger 18 and an air cooler 22 in a plenum chamber 3 to realize heat exchange.

With regard to an increase in the temperature of the secondary refrigerant exiting from the air heat exchanger 18 and the air cooler 22, an opening of a first regulating valve 43 and an opening of a second regulating valve 50 are regulated to realize matching and fast response of refrigeration capacity. That is, when the test requires a high refrigeration capacity, the opening of the second regulating valve 50 is larger, and the opening of the first regulating valve 43 is smaller, such that the secondary refrigerant flows into the air heat exchanger 18 through a secondary refrigerant into-heat-exchanger pipe 38 at a high flow rate to maintain the temperature required by the test. When the test requires a low refrigeration capacity, the opening of the second regulating valve 50 is smaller, and the opening of the first regulating valve 43 is larger, such that the secondary refrigerant flows into the air heat exchanger 18 through the secondary refrigerant into-heat-exchanger pipe 38 at a low flow rate to maintain the temperature required by the test. The opening of the first regulating valve 43 and the opening of the second regulating valve 50 are automatically regulated according to the test temperature to regulate the temperature of the secondary refrigerant entering the air heat exchanger 18 and the air cooler 22 and to finally realize temperature control in a test section 7, thereby simulating the low-temperature environment.

Step 2) simulation of low-temperature wind environment: After realizing the low-temperature environment required by simulation of a snowfall test in step 1), i.e. after firstly outputting the low-temperature secondary refrigerant by the refrigeration system 2 and then delivering the low-temperature secondary refrigerant to the air heat exchanger 18 in the settling chamber 5 of the wind tunnel to simulate the low-temperature environment required by the snowfall test, providing a wind environment of the test section 7 mainly by a power system. A motor drives a fan 25 to generate an air flow, the air flow is guided by guide vanes 26 in a transition section 8, rectified by a honeycomb 16 and screens 17 in a settling chamber 5, cooled by the air heat exchanger 18 and developed over a long distance at the test section 7 to finally form a stable low-temperature atmospheric boundary layer flow field at the test section 7, and the returned hot air is cooled again by the settling chamber 5 and preserved by external cold room panels 12, thereby forming the closed low-temperature wind environment in the tunnel.

Step 3) simulation of snowfall process: After simulating the low-temperature wind environment in step 2), i.e. after providing the low-temperature wind environment by the atmospheric boundary layer wind tunnel 1 and the refrigeration system 2, snow particles are continuously provided by using snow stored in a storage room 20 of a plenum chamber 3 and a snow particle vibratory spreading device 24 in the operation room 21 such that the particles after the vibration are transported by the air flow and uniformly spread in the test section 7, thereby forming a uniform and stable snowfall environment.

In step 1), when the refrigerating unit 31 works, a cooling tower 39 provides cooling water to maintain a condensation number required when the refrigerating unit 31 works, and a cooling water pump 40 provides power to keep the cooling water circulating continuously.

The large-scale low-temperature controllable atmospheric boundary layer test system for wind and snow simulation according to this application has the following characteristics:

(1) According to the design requirements of the atmospheric boundary layer wind tunnel, the length of the test section 7 of the wind tunnel is 6-10 times the diameter of the test section. The wind tunnel is designed to be vertical to reduce the floor area and prevent the snowfall from affecting the power system.

(2) The contraction section 6 is disposed upstream of the lower flow channel to accelerate the incoming flow and reduce the longitudinal and lateral turbulence intensities of the air flow. The honeycomb 16 and the screens 17 are disposed in the settling chamber to divide the large-scale vortices into small-scale vortices, thereby accelerating the vortex decay, reducing the turbulence intensities and providing high-quality inflow conditions for the test section 7 at the downstream.

(3) In order to reduce the flow separation on the inner side of the inlet and the outer side of the outlet at the corners (transition sections 8) of the wind tunnel and reduce the kinetic energy loss, the wing type guide vanes 26 with less loss are additionally disposed in the transition sections.

(4) The key of the design of the power section lies in the design of the fan 25, including fan form, hub diameter ratio, lift coefficient, number and shape of fan blades, number and shape of anti-rotation vanes, fairing slenderness ratio, fairing shape, etc. In this regard, a collar strategy is used to design the fan according to constant circulation velocity distribution, and large-scale low-noise blades are adopted to ensure the uniform outflow of the power system.

(5) Based on the requirements of the test conditions of the wind tunnel project to be developed for the performance and control of the temperature control system in combination with the existing successful cases, after comprehensively considering the cost performance, the refrigeration manner of the refrigeration system 2, the schematic diagram of the refrigeration system, and the composition of main equipment and main ancillary equipment of the refrigeration system are scientifically determined. According to the determined temperature control performance indicators of the wind tunnel, (a plurality of) preliminary schemes are designed for the refrigeration system. The preliminary design schemes are compared based on the cost performance to find the most rational design scheme.

(7) Details are designed on the basis of the preliminary design schemes, mainly including: determining the type of the refrigerating unit 31, the model of the secondary refrigerant, the type of the buffer tank 33, the type of the primary chilled water pump 32, the type of secondary chilled water pump 36, the type of cooling water pump 40, the type of the air heat exchanger 18, the type of the air cooler 22, the types of valves and pipe fittings, etc.

(8) After the requirements for the types of the main equipment are determined, calculations are made for equipment model selection. Firstly, according to the requirements of the temperature control performance indicators of the wind tunnel and the related performance parameters of the wind tunnel maintenance structure, the cooling load required by each test condition is calculated. By comparison, the limit load is selected as the basis for model selection for the refrigerating unit 31, the air heat exchanger 18 and the air cooler 22. After the refrigeration unit 31 is selected, the load of the cooling equipment is calculated according to relevant parameters of the selected refrigerating unit, and on this basis, model selection of the cooling equipment is carried out. According to the limit cooling load of the test section and the cooling load of the compressor, the flow rate of the cooling water and the flow rate of the chilled water (secondary refrigerant) required are calculated, and on this basis, the water pumps are selected.

(9) According to the size, weight, power and other parameters of the main equipment, the position and floor area of the equipment room are reasonably selected, and the equipment is reasonably arranged while comprehensively considering factors such as load bearing and noise.

(10) Based on the requirements of the wind tunnel project to be developed for automatic low-temperature control, relevant control hardware is configured, and the control software and a software system for data tracking and acquisition, real-time transmission, processing and demodulation, anomaly recognition, in-time feedback and dynamic display are established.

The above description is only the preferred examples of the present disclosure and is not intended to limit the present disclosure. Any modifications, equivalent substitutions and improvements made within the spirit and principles of the present disclosure should be included within the protection scope of the present disclosure.

What is claimed is:

1. A large-scale low-temperature controllable atmospheric boundary layer test system for wind and snow simulation, comprising an atmospheric boundary layer wind tunnel (1), a plenum chamber (3) and a refrigeration system (2), wherein the atmospheric boundary layer wind tunnel (1) is a closed return wind tunnel, the plenum chamber (3) and the refrigeration system (2) are both disposed outside the atmospheric boundary layer wind tunnel (1), and the plenum chamber (3) is disposed at an inner loop space of the closed return wind tunnel;

wherein the atmospheric boundary layer wind tunnel (1) comprises an upper flow channel (10) and a lower flow channel (11) communicating with each other end to end, a power section (9) is arranged in the upper flow channel (10), a settling chamber (5), a contraction section (6) and a test section (7) are sequentially arranged in the lower flow channel (11) from upstream to downstream, corners of the closed return wind tunnel are respectively provided with a transition section (8), a fan (25) is disposed in the power section (9), and an air heat exchanger (18) is disposed in the settling chamber (5);

wherein the plenum chamber (3) is divided by a partition (19) into a storage room (20) for storing snow particles and an operation room (21) provided with a snow particle vibratory spreading device (24), the storage room (20) is located at an upper part of the settling chamber (5), an air cooler (22) is disposed in the storage room (20), the operation room (21) is located at an upper part of the test section (7), and the snow particle vibratory spreading device (24) spreads snow particles that uniformly fall into the test section (7);

wherein the refrigeration system (2) outputs a secondary refrigerant for heat exchange for the air cooler (22) in the plenum chamber (3) and the air heat exchanger (18) in the settling chamber (5) of the atmospheric boundary layer wind tunnel (1);

wherein the refrigeration system (2) comprises a cold source system (27), the cold source system (27) comprises a primary circulation system (28), a secondary circulation system (29) and a cooling circulation system (30), the primary circulation system (28) comprises a refrigerating unit (31), a primary chilled water pump (32), a buffer tank (33), a primary circulation secondary refrigerant into-buffer-tank pipe (34), a primary circulation secondary refrigerant out-of-buffer-tank pipe (44), a secondary refrigerant into-refrigerating-unit pipe (35) and a secondary refrigerant out-of-refrigerating-unit pipe (45), the secondary circulation system (29) comprises a secondary chilled water pump (36), a secondary circulation secondary refrigerant into-buffer-tank pipe (37), a secondary circulation secondary refrigerant out-of-buffer-tank pipe (46), a secondary refrigerant into-heat-exchanger pipe (38) and a secondary refrigerant out-of-heat-exchanger pipe (47), and the cooling circulation system (30) maintains a condensation number required when the refrigerating unit (31) works; and wherein a liquid outlet of the refrigerating unit (31) communicates with a liquid inlet of the primary chilled water pump (32) through the secondary refrigerant out-of-refrigerating-unit pipe (45), a liquid outlet of the primary chilled water pump (32) communicates with a cold end liquid inlet of the buffer tank (33) through the primary circulation secondary refrigerant into-buffer-tank pipe (34), a cold end liquid outlet of the buffer tank (33) communicates with the secondary refrigerant into-refrigerating-unit pipe (35) through the primary circulation secondary refrigerant out-of-buffer-tank pipe (44), the secondary refrigerant into-refrigerating-unit pipe (35) communicates with a liquid inlet of the refrigerating unit, a hot end liquid outlet of the buffer tank (33) communicates with a liquid inlet of the secondary chilled water pump (36) through the secondary circulation secondary refrigerant out-of-buffer-tank pipe (46), a liquid outlet of the secondary chilled water pump (36) exchanges heat for the air cooler (22) and the air heat exchanger (18) through the secondary refrigerant into-heat-exchanger pipe (38), and the heat-exchanged secondary refrigerant enters a hot end liquid inlet of the buffer tank (33) through the secondary refrigerant out-of-heat-exchanger pipe (47) and the secondary circulation secondary refrigerant into-buffer-tank pipe (37).

2. The large-scale low-temperature controllable atmospheric boundary layer test system for wind and snow simulation according to claim 1, wherein a net cross-sectional size of the test section (7) in the lower flow channel (11) is 2 meter×2 meter.

3. The large-scale low-temperature controllable atmospheric boundary layer test system for wind and snow simulation according to claim 1, wherein a honeycomb (16) and screens (17) are disposed in the settling chamber (5), and guide vanes (26) are disposed in the transition section (8).

4. The large-scale low-temperature controllable atmospheric boundary layer test system for wind and snow simulation according to claim 1, wherein the operation room (21) has an openable bottom, and a slide rail (23) for installing the snow particle vibratory spreading device (24) is disposed in the operation room (21).

5. The large-scale low-temperature controllable atmospheric boundary layer test system for wind and snow simulation according to claim 1, wherein the upper flow channel (10), the lower flow channel (11) and the plenum chamber (3) are in the form of a spliced structure of cold room panels (12), a sealant is applied to splicing seams, and a structural steel frame (14) is used outside the spliced structure.

6. The large-scale low-temperature controllable atmospheric boundary layer test system for wind and snow simulation according to claim 1, wherein the atmospheric boundary layer wind tunnel (1) is supported on a foundation (15) by a plurality of structural steel frames (14).

7. The large-scale low-temperature controllable atmospheric boundary layer test system for wind and snow simulation according to claim 1, wherein a communicating pipe (4) is disposed between the secondary refrigerant into-heat-exchanger pipe (38) and the secondary circulation secondary refrigerant out-of-buffer-tank pipe (46), a first regulating valve (43) is disposed on the communicating pipe (4), and a second regulating valve (50) is disposed on the secondary refrigerant into-heat-exchanger pipe (38).

8. The large-scale low-temperature controllable atmospheric boundary layer test system for wind and snow simulation according to claim 1, wherein the cooling circulation system (30) comprises a cooling tower (39), a cooling water pump (40), a cooling tower water inlet pipe (41), a cooling tower water outlet pipe (48), a condenser water inlet pipe (42) and a condenser water outlet pipe (49); the cooling tower (39) communicates with a water inlet of the cooling water pump (40) through the cooling tower water outlet pipe (48), a water outlet of the cooling water pump (40) communicates with a cold end water inlet of the refrigerating unit (31) through the condenser water inlet pipe (42), a cold end water outlet of the refrigerating unit (31) communicates with the condenser water outlet pipe (49), the condenser water outlet pipe (49) communicates with the cooling tower water inlet pipe (41), and the cooling tower water inlet pipe (41) communicates with a water inlet of the cooling tower (39).

9. A method of use of the large-scale low-temperature controllable atmospheric boundary layer test system for wind and snow simulation according to claim 1, comprising the following steps:
   step 1) simulation of low-temperature environment: during the test, firstly setting a temperature value of a buffer tank (33) according to a test temperature, regulating a refrigeration load by a refrigerating unit (31) according to a set temperature of the buffer tank (33) such that a temperature of a secondary refrigerant output by the refrigerating unit (31) is consistent with the set temperature of the buffer tank (33), delivering the secondary refrigerant with a certain temperature into the buffer tank (33) by the primary chilled water pump (32), and after the buffer tank (33) reaches the set temperature, starting the secondary chilled water pump (36) such that the secondary refrigerant is pressurized by the secondary chilled water pump (36) to enter the air heat exchanger (18) and the air cooler (22) in the plenum chamber (3) to realize heat exchange;
   with regard to an increase in the temperature of the secondary refrigerant exiting from the air heat exchanger (18) and the air cooler (22), regulating an opening of a first regulating valve (43) and an opening of a second regulating valve (50) to realize matching and fast response of refrigeration capacity, wherein when the test requires a high refrigeration capacity, the opening of the second regulating valve (50) is larger, and the opening of the first regulating valve (43) is smaller, such that the secondary refrigerant flows into the air heat exchanger (18) through a secondary refrigerant into-heat-exchanger pipe (38) at a high flow rate to maintain the temperature required by the test; when the test requires a low refrigeration capacity, the opening of the second regulating valve (50) is smaller, and the opening of the first regulating valve (43) is larger, such that the secondary refrigerant flows into the air heat exchanger (18) through the secondary refrigerant into-heat-exchanger pipe (38) at a low flow rate to maintain the temperature required by the test; and the opening of the first regulating valve (43) and the opening of the second regulating valve (50) are automatically regulated according to the test temperature to regulate the temperature of the secondary refrigerant entering the air heat exchanger (18) and the air cooler (22) and to finally realize temperature control in a test section (7), thereby simulating the low-temperature environment;
   step 2) simulation of low-temperature wind environment: after realizing the low-temperature environment required by simulation of a snowfall test in step 1), providing a wind environment of the test section (7) mainly by a power system, wherein a motor drives a fan (25) to generate an air flow, the air flow is guided by guide vanes (26) in a transition section (8), rectified by a honeycomb (16) and screens (17) in a settling chamber (5), cooled by the air heat exchanger (18) and developed over a long distance at the test section (7) to finally form a stable low-temperature atmospheric boundary layer flow field at the test section (7), and the returned hot air is cooled again by the settling chamber (5) and preserved by external cold room panels (12), thereby forming a closed low-temperature wind environment in a tunnel; and
   step 3) simulation of snowfall process: after simulating the low-temperature wind environment in step 2), continuously providing snow particles by using snow stored in the storage room (20) of the plenum chamber (3) and a snow particle vibratory spreading device (24) in the operation room (21) such that the snow particles after vibration are transported by the air flow and uniformly spread in the test section (7), thereby forming a uniform and stable snowfall environment.

10. The method of claim 9, wherein in step 1), when the refrigerating unit (31) is under operation, a cooling tower (39) provides cooling water to maintain a condensation number required when the refrigerating unit (31) is under operation, and a cooling water pump (40) provides power to keep the cooling water circulating continuously.

* * * * *